US011332241B2

(12) United States Patent
Gonzalez

(10) Patent No.: US 11,332,241 B2
(45) Date of Patent: May 17, 2022

(54) CENTRIFUGAL FANS FOR VERTICAL TAKE-OFF AND LANDING (VTOL) AIRCRAFT PROPULSION

(71) Applicant: Aurora Flight Sciences Corporation, Manassas, VA (US)

(72) Inventor: Luis Gonzalez, Cambridge, MA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 100 days.

(21) Appl. No.: 16/843,203

(22) Filed: Apr. 8, 2020

(65) Prior Publication Data
US 2021/0316852 A1 Oct. 14, 2021

(51) Int. Cl.
*B64C 29/00* (2006.01)
*B64C 11/00* (2006.01)
*B64C 39/08* (2006.01)
*B64C 27/28* (2006.01)

(52) U.S. Cl.
CPC ........ *B64C 29/0033* (2013.01); *B64C 11/001* (2013.01); *B64C 39/08* (2013.01); *B64C 27/28* (2013.01)

(58) Field of Classification Search
CPC ... B64C 29/0033; B64C 39/08; B64C 11/001; B64C 27/28
See application file for complete search history.

(56) References Cited

U.S. PATENT DOCUMENTS

| | | | | |
|---|---|---|---|---|
| 2,774,554 A | * | 12/1956 | Ashwood | B64C 29/0091 244/23 R |
| 4,828,203 A | * | 5/1989 | Clifton | B64C 29/0025 244/12.3 |
| 5,419,514 A | * | 5/1995 | Ducan | B64C 29/0033 244/12.4 |
| 10,059,440 B2 | * | 8/2018 | Erdozain, Jr | B64C 11/02 |
| 2010/0193644 A1 | * | 8/2010 | Karem | B64C 27/28 244/7 R |
| 2015/0375860 A1 | * | 12/2015 | Hong | B64D 35/00 244/12.4 |
| 2019/0382110 A1 | * | 12/2019 | Cottrell | B64C 27/26 |
| 2020/0207468 A1 | * | 7/2020 | Bucheru | B60V 3/08 |
| 2020/0307767 A1 | * | 10/2020 | Greenberg | B64C 23/02 |
| 2020/0354049 A1 | * | 11/2020 | Noppel | B64C 39/024 |
| 2020/0385104 A1 | * | 12/2020 | Stone | B64D 27/02 |

FOREIGN PATENT DOCUMENTS

DE 202013011155 U1 * 3/2014 ............ B64C 39/10

* cited by examiner

*Primary Examiner* — Valentina Xavier
(74) *Attorney, Agent, or Firm* — Gates & Cooper

(57) ABSTRACT

An apparatus including a thrust vectoring system including a centrifugal fan and a nozzle configured to output an exhaust from the centrifugal fan, wherein the thrust vectoring system is configured to controllably orient at least one of, the centrifugal fan or the nozzle, to vector a thrust generated by the exhaust.

21 Claims, 13 Drawing Sheets

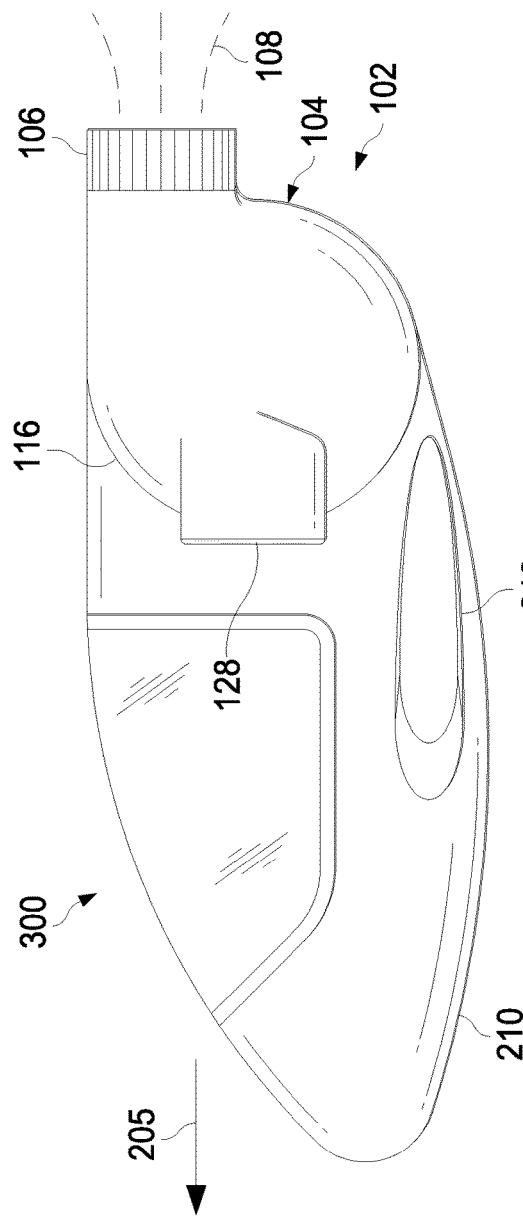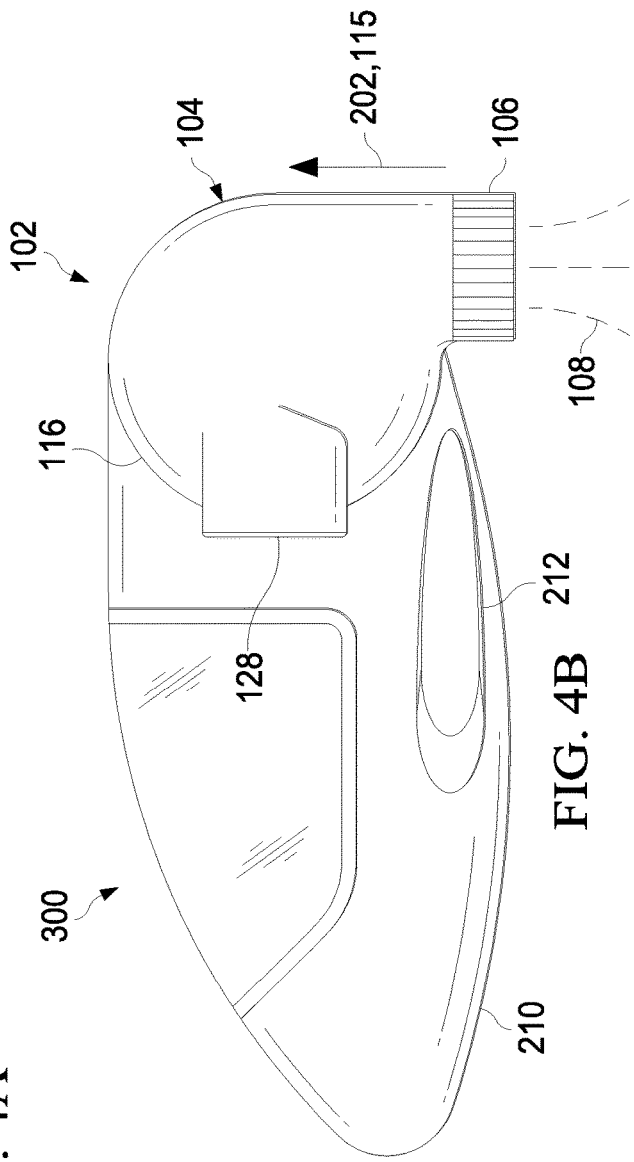

CENTRIFUGAL FANS FOR VERTICAL TAKE-OFF AND LANDING (VTOL) AIRCRAFT PROPULSION

BACKGROUND

1. Field

The present disclosure relates generally to systems and methods for thrust vectoring an aircraft.

2. Description of the Related Art

In certain circumstances, it is desirable to configure an airplane for vertical take-off and landing (VTOL). Some VTOL aircraft (e.g., helicopters, tilt-rotor aircraft, and vectored thrust aircraft) use single propulsion systems in which the horizontal and vertical thrusts (cruise and vertical flight) are produced by the same device. Some of these VTOL airplanes utilize tilt mechanisms to tilt, or physically translate/rotate, their propulsors between an orientation that provides vertical thrust, such as for take-off and landing, and an orientation that provides horizontal thrust, such as for horizontal flight. Other VTOL aircraft use dedicated propulsion systems in which one propulsion device is used for vertical thrust and a separate apparatus produces the horizontal thrust. However, conventional single propulsion systems and dedicated propulsion systems may significantly increase the cost, complexity, and/or weight of the VTOL airplane. Thus, there exists a need for improved propulsors for use with VTOL aircraft. The present disclosure satisfies this need.

SUMMARY

Thrust vectoring systems, aircraft including the same, and associated methods are disclosed herein. Illustrative, non-exclusive examples of inventive subject matter according to the present disclosure are described in the following enumerated paragraphs:

A1. An apparatus, comprising:
a thrust vectoring system including a centrifugal fan and a nozzle configured to output an exhaust from the centrifugal fan, wherein the thrust vectoring system is configured to controllably orient at least one of, the centrifugal fan or the nozzle, to vector a thrust generated by the exhaust.

A2. The apparatus of paragraph A1, wherein the thrust vectoring system is configured to orient the at least one of, the centrifugal fan or the nozzle, to vector the thrust in a desired direction.

A3. The apparatus of paragraph A2, wherein the desired direction includes at least one of: a vertical direction for a vertical take-off or a vertical landing of an aircraft operatively coupled to the thrust vectoring system, a forward direction for a forward cruising of the aircraft, a first transition direction for transitioning between the vertical take-off and the forward cruising, or a second transition direction for transitioning between the forward cruising and the vertical landing.

A4. The apparatus of paragraph A2 or A3, wherein:
the centrifugal fan further includes a housing and a fan disposed in the housing,
the fan 118 includes a plurality of fan blades attached to a hub, and
the apparatus further comprises a drive shaft having a rotation axis, the drive shaft operatively coupled to the hub to rotate the fan blades about the rotation axis.

A5. The apparatus of paragraph A4, further comprising a mechanism configured to rotatably connect the housing to the aircraft, such that the housing rotates about the rotational axis to vector the thrust.

A6. The apparatus of paragraph A4, wherein the nozzle is movably connected to the centrifugal fan, such that the nozzle can be rotated about the rotational axis to vector the thrust.

A7. The apparatus of any of the paragraphs A1-A6, wherein:
the thrust vectoring system includes an inlet configured to direct a flow of air into the centrifugal fan along a first direction, and
the centrifugal fan is configured to redirect and form the flow of the air into the exhaust along a second direction.

A8. An aircraft comprising the thrust vectoring system of any of the paragraphs A1-A7, wherein the thrust vectoring system vectors the thrust propelling the aircraft.

A9. The aircraft of paragraph A8, wherein the aircraft comprises a fuselage and the centrifugal fan is within the fuselage.

A10. The aircraft of paragraph A9, wherein the centrifugal fan is positioned to gyroscopically stabilize the aircraft when the centrifugal fan is operating.

A11. The aircraft of paragraph A8, further comprising:
a wing, wherein the centrifugal fan is positioned on the wing.

A12. The aircraft of any paragraph A8, further comprising:
a canard, wherein the centrifugal fan is positioned on the canard.

A13. The aircraft of paragraph A8, further comprising:
a propulsor different from the centrifugal fan, wherein the propulsor is configured to provide an additional thrust for the aircraft in combination with the thrust generated by the exhaust.

A14. The aircraft of paragraph A8, wherein the at least one of, the centrifugal fan or the nozzle, are movably connected to the aircraft such that the thrust vectoring system orients the at least one of, the centrifugal fan or the nozzle, relative to the aircraft to generate and vector the thrust.

B1. A method of vectoring thrust, comprising:
generating a thrust, via a thrust vectoring system, by outputting an exhaust from a centrifugal fan, wherein the thrust vectoring system includes the centrifugal fan and a nozzle; and vectoring the thrust by controllably orienting at least one of the centrifugal fan or the nozzle.

B2. The method of paragraph B1, wherein the orienting vectors the thrust for at least one of: a vertical take-off of an aircraft coupled to the thrust vectoring system, a forward cruising of the aircraft, a first transition between the vertical take-off and the forward cruising, a vertical landing of the aircraft, or a second transition between the forward cruising and the vertical landing.

B3. The method of paragraph B1, wherein:
the thrust vectoring system includes an inlet configured to direct a flow of air into the centrifugal fan,
the centrifugal fan includes a housing and a fan disposed in the housing,
the fan includes a plurality of fan blades attached to a hub,
the thrust vectoring system further comprises a drive shaft having a rotation axis, the drive shaft operatively coupled to the hub to rotate the fan blades about the rotation axis, and
the method further comprising redirecting the flow of the air using the centrifugal fan to form the flow of air into the exhaust and the orienting comprising turning the housing or the nozzle about the rotation axis to vector 112, direct, or adjust the thrust 114.

B4. The method of paragraph B1, further comprising:
operably coupling the thrust vectoring system to an aircraft including a fuselage; and
positioning the centrifugal fan within the fuselage.

B5. The method of paragraph B1, further comprising:
operably coupling the thrust vectoring system to an aircraft including a wing; and
positioning the centrifugal fan on the wing.

B6. The method of paragraph B1, further comprising:
operably coupling the thrust vectoring system to an aircraft including a canard; and positioning the centrifugal fan on the canard.

BRIEF DESCRIPTION OF THE DRAWINGS

FIGS. 1A-1G illustrate a centrifugal fan according to a first example, wherein FIG. 1A is an isometric view, FIG. 1B illustrates the fan or impeller inside the housing, FIG. 1C is a rear cross-sectional view across a width of the centrifugal fan, showing the intake, FIG. 1D is a side cross-sectional view across a length of the centrifugal fan, FIG. 1E is top cross-sectional view, FIG. 1F is a full sectional view showing the interior of the centrifugal fan including the fan or impeller, and FIG. 1G is side cross-sectional view, illustrating the nozzle rigidly attached to the housing and the housing rotating about the connection point in order to vector or direct the exhaust.

FIG. 3A-FIG. 3C illustrate example installations of a propulsion system comprising a centrifugal fan buried inside the body or fuselage of an aircraft, wherein FIG. 3A is an isometric view, FIG. 3B is a perspective view with the port side removed to show the propulsion system, and FIG. 3C is a top cross-sectional view with panels and/or skin of the fuselage removed to show the arrangement of the fans inside the fuselage.

FIG. 4A and FIG. 4B illustrate orientation of the centrifugal fan illustrated in FIGS. 3A-3C, wherein FIG. 4A shows the orientation for the centrifugal fan for cruise and FIG. 4B shows the orientation of the centrifugal fan for vertical flight.

DESCRIPTION

Figure 1A:
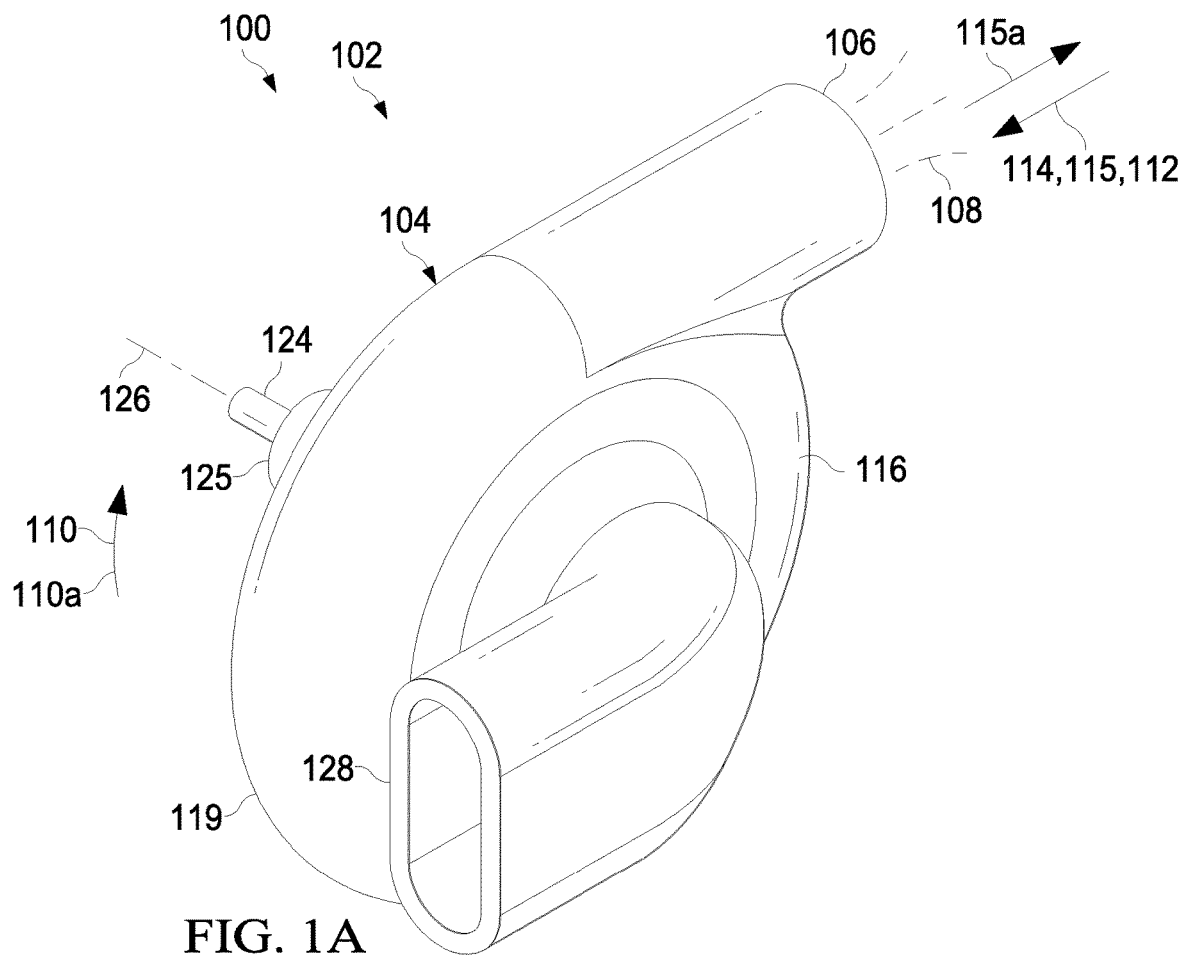
Figure 1B:
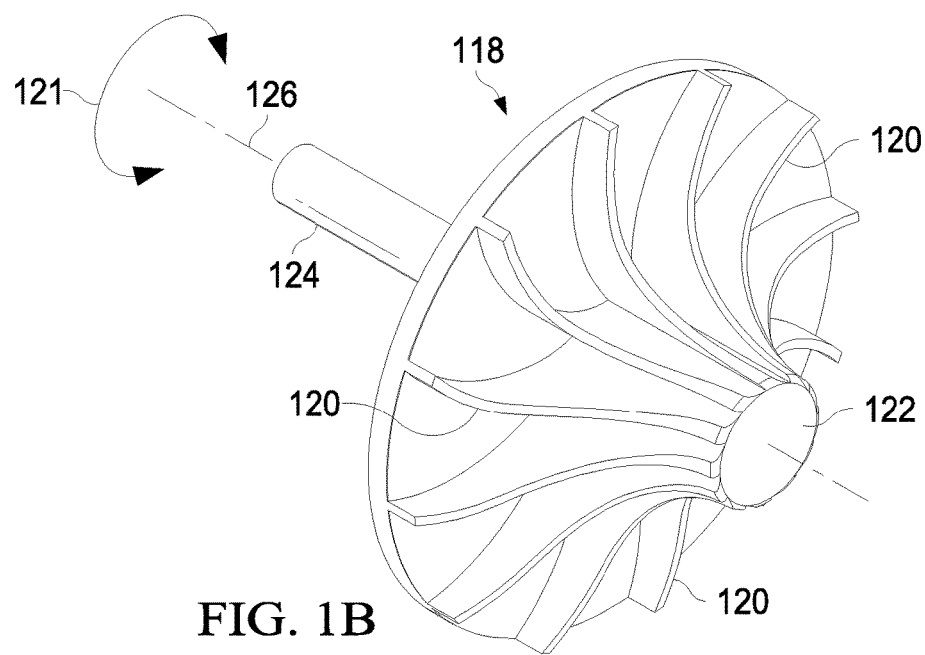
Figure 1C:
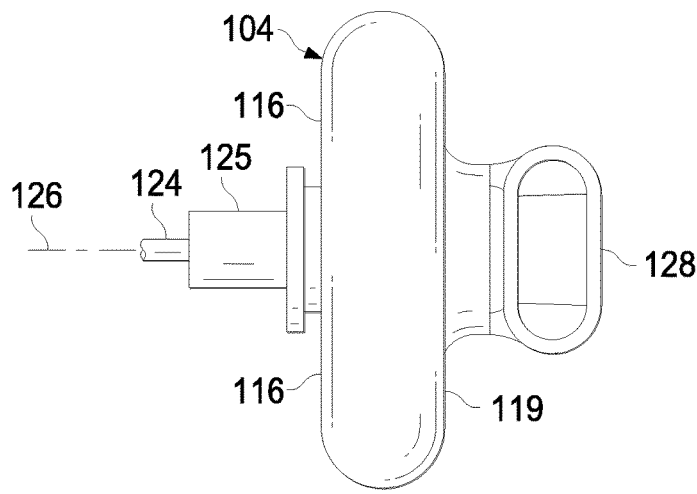
Figure 1D:
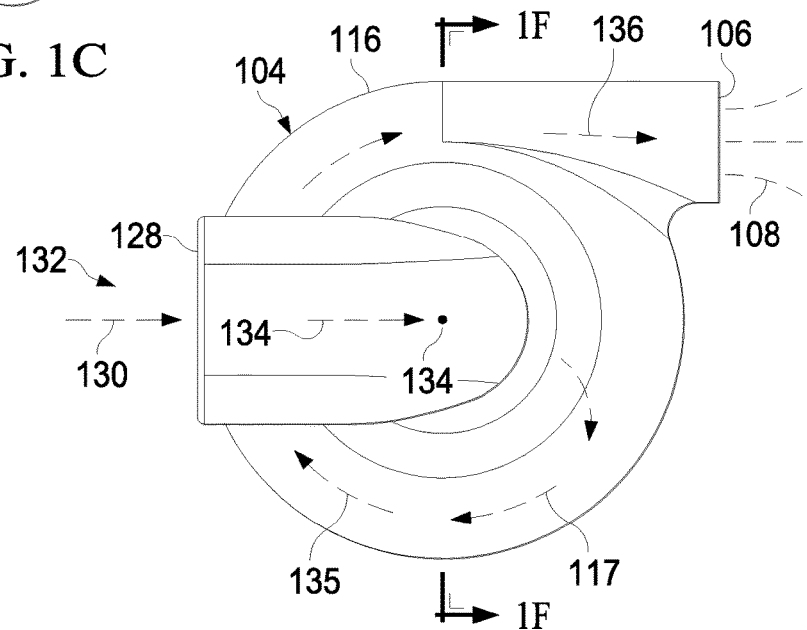
Figure 1E:
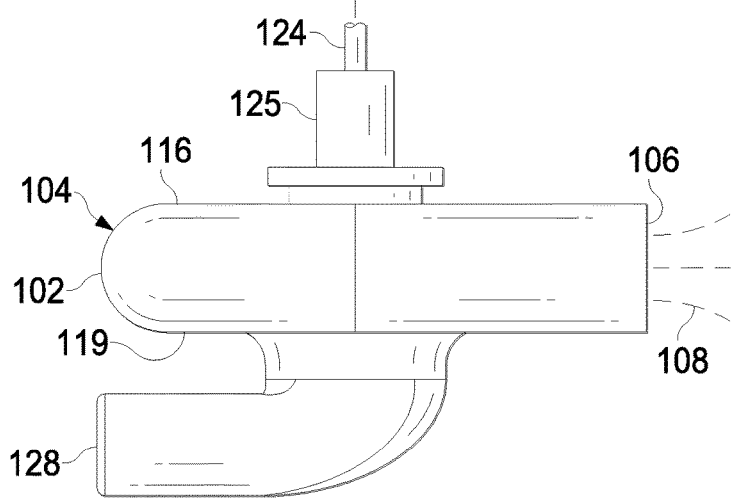
Figure 1F:
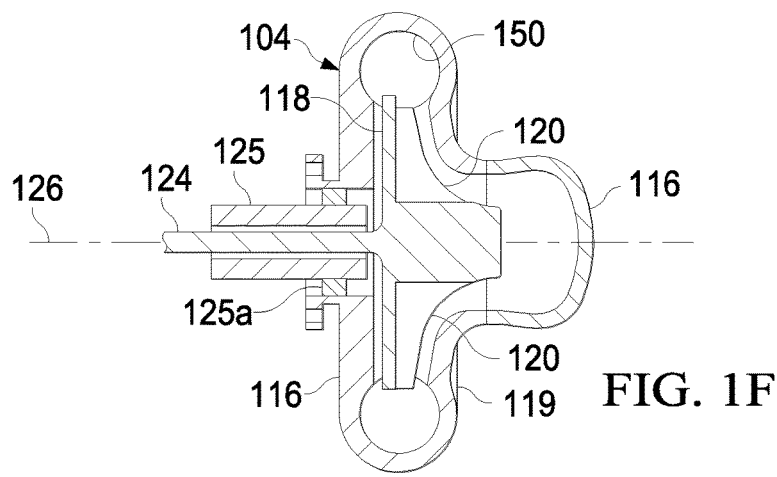

In the following description, reference is made to the accompanying drawings which form a part hereof, and which is shown, by way of illustration, several examples. It is understood that other examples may be utilized and structural changes may be made without departing from the scope of the present disclosure.

Technical Description

The present disclosure describes a propulsion system for an vehicle that can transition between vertical take-off and landing (VTOL) operation and cruise. The system comprises one or more centrifugal fans that are oriented at one or more appropriate locations on the vehicle and are rotated relative the vehicle so as to produce thrust in a desired direction.

Example Apparatus

FIGS. 1A-1I illustrate an apparatus 100 comprising a thrust vectoring system 102 including a centrifugal fan 104 and an outlet (e.g., a duct or a nozzle 106) configured to output an exhaust 108 from the centrifugal fan 104. The thrust vectoring system 102 is configured to controllably orient 110 at least one of, the centrifugal fan 104 or the nozzle, to vector 112 or direct a thrust 114 generated by the exhaust 108. The thrust 114 is substantially in a direction 115 opposite the direction 115a of the exhaust 108.

The centrifugal fan 104 further includes a housing 116 (e.g., comprising a casing 119) and a fan 118 (e.g., an impeller) disposed in the housing 116. The fan 118 includes a plurality of fan blades 120 attached to a hub 122. The apparatus 100 further comprises a drive shaft 124 having a rotation axis 126, wherein the drive shaft 124 is operatively coupled to the hub 122. Power from a motor operably connected to the drive shaft 124 is transmitted to the drive shaft 124 so as to drive a rotation 121 of the hub 122 and the fan blades about the rotation axis 126.

The centrifugal fan 104 driven by drive shaft 124 redirects and forms a flow 130 of the air 132 into the exhaust. The rotation 121 of the fan blades 120 redirects 135, and in some examples accelerates, the flow 130 of the air 132 received on the fan blades 120 so as to form an output flow 117, for example, directed in a radial direction away from the rotation axis 126 and/or in a tangential direction 135b circulating around the rotational axis 126. In one or more examples, the housing 116 functions as diffuser and collector of the output flow 117 that is expelled from the fan 118 and transfers the output flow 117 to the nozzle 106. In various examples, the housing 116 is shaped or ducted to expand the output flow 117 in the radial direction, the tangential/circumferential direction, circulating or circling the rotation axis 126 and/or to build pressure of the output flow 117. In one or more further examples, the housing 116 includes a duct to direct the output flow 117 into the nozzle 106. In yet further examples, the nozzle 106 is tapered or shaped to accelerate the exhaust 108. In one or more examples, the fan blades accelerate the flow 130 of the air 132 through application of a centrifugal force.

FIGS. 1A-1G further illustrate the centrifugal fan 104 further includes an inlet 128 (e.g., an intake) configured to direct the flow 130 of air 132 into the centrifugal fan along a first direction 134 (e.g., an axial direction parallel to the rotation axis 126). In some applications, the use of an inlet 128 helps direct the flow 130 of air 132 into the fan 118. Example inlet configurations include, but are not limited to, the inlet comprising a scoop or scoop shape. In one or more examples, the inlet 128 is mounted on bearings so that the housing 116 rotates relative to the inlet 128. In other examples, the inlet 128 is integral with the housing 116.

Figure 1G:
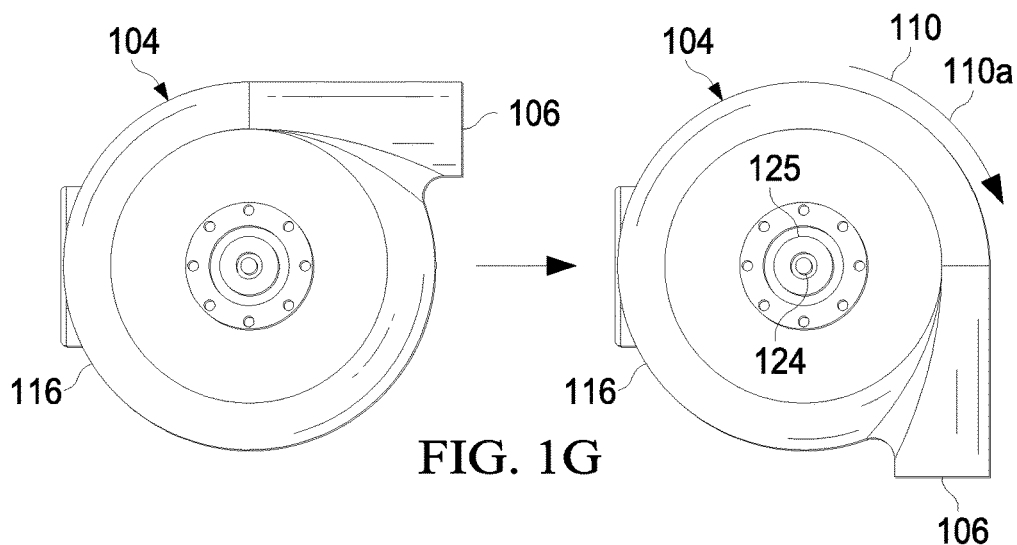
Figure 1H:
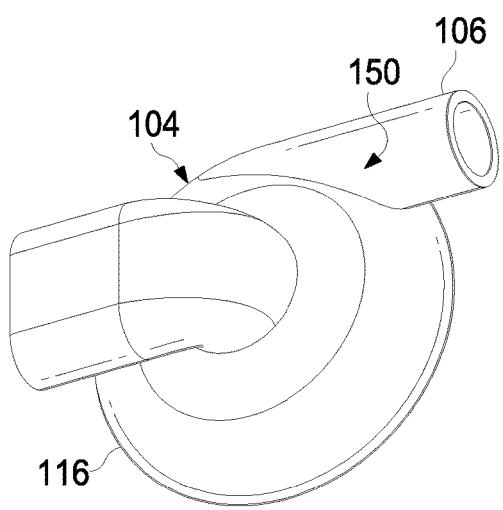
FIG. 1H and FIG. 1I illustrate a centrifugal fan according to a second example wherein the nozzle moves relative to the housing to orient the exhaust.
Figure 1I:
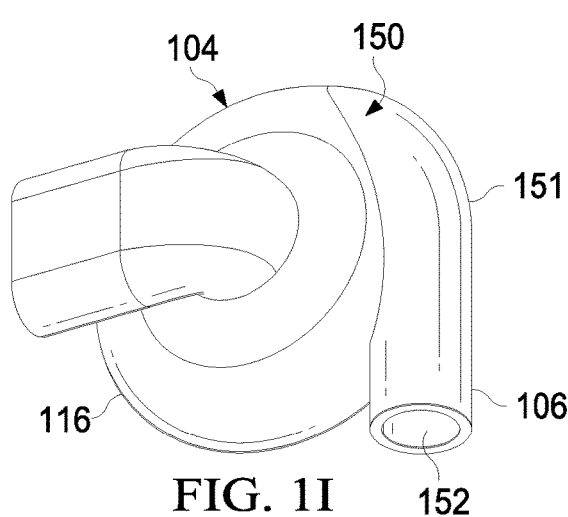

FIG. 1G illustrates an example apparatus 100 including a mechanism 125 configured to rotatably connect or mount the housing 116 to a structure on a vehicle, such that the housing 116 rotates 110a about the rotational axis 126 to vector 112 or direct the thrust 114 generated by the exhaust 108. Example mechanisms 125 include, but are not limited to, bearings 125*a*. The example of FIG. 1G illustrates the housing 116 is rigidly attached to the nozzle 106, e.g., by fabricating the housing 116 and the nozzle 106 from one piece or forming the nozzle 106 integrally with the housing 116. FIGS. 1H and 1I illustrate an example wherein the nozzle 106 is configured so as to movably or slidably connect to the centrifugal fan 104, such that the nozzle 106 is moved (e.g., rotated and/or tilted) independently of the housing 116 and relative to the vehicle, e.g., about the rotational axis 126, to vector 112 or direct the thrust 114. FIG. 1I illustrate the nozzle 106 includes a screen or extension 151 that covers an outlet 150 in the centrifugal fan 104 when the nozzle 106 is moved to vector the thrust 114 downwards. The screen or extension 151 guides the exhaust 108 from the outlet 150 to the opening in the nozzle 106. In one or more examples, the housing 116 and inlet 128 are fixed in space or fixed to the vehicle, and only the nozzle 106 is oriented to vector 112 or direct the exhaust (108) in the direction 115*a* so as to generate the thrust 114 in the desired direction 115 opposite to the direction 115*a* of the exhaust 108.

Example Installations of the Thrust Vectoring System

Figure 2A:
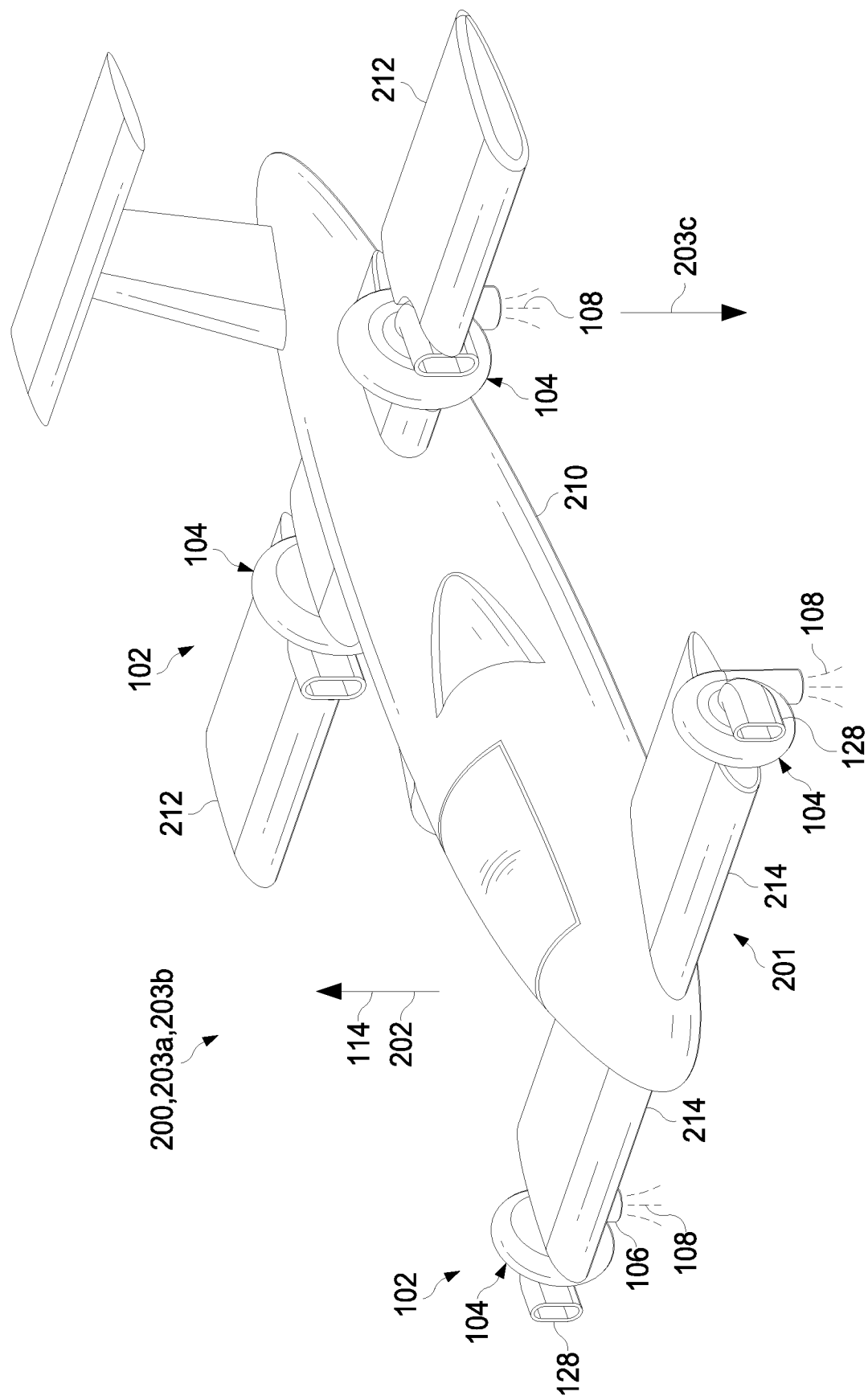
FIG. 2A and FIG. 2B illustrate example installations of the centrifugal fan on a wing and canard of a VTOL aircraft, and operation of the centrifugal fan for take-off (FIG. 2A) and cruise (FIG. 2B).
Figure 2B:
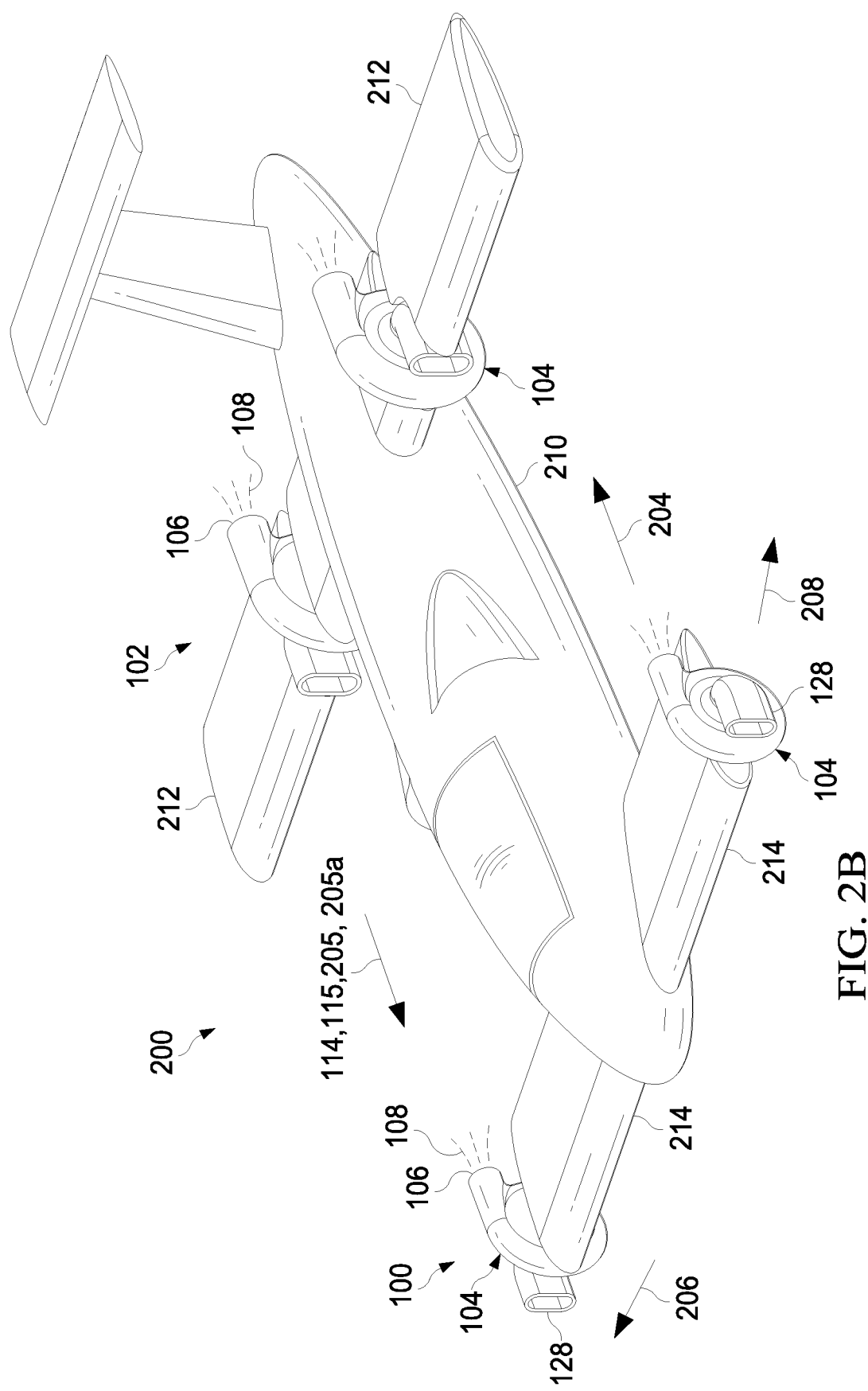

FIGS. 2A and 2B illustrate the thrust vectoring system 102 operatively coupled to the vehicle 201 comprising an aircraft 200 to control flight or attitude of the aircraft 200. At least one of the centrifugal fan 104 or the nozzle 106 are configured or movably connected to the aircraft 200 such that the thrust vectoring system 102 orients the at least one of, the centrifugal fan 104 or the nozzle 106, relative to the aircraft 200 to generate and vector 112 the thrust 114 in a desired direction 115. The desired direction 115 includes at least one of: a vertical direction 202 for a vertical take-off 203*a* or a vertical landing 203*b* of the aircraft 200 (exhaust 108 in a downward direction 203*c*), a forward direction 205 for a forward cruising 205*a* of the aircraft 200 (exhaust in rearward direction 204), a rearward direction for rearward cruising or hovering (exhaust 108 in a forward direction), a first transition direction 206 for transitioning between the vertical take-off 203*a* and the forward cruising 205*a*, a second transition direction 208 for transitioning between the forward cruising 205*a* and the vertical landing 203*b*, or third transition for transitioning between rearward cruising and vertical flight. In one or more examples, during the exhaust 108 provides thrust 114 in an upwards direction to control or slow the descent under gravity during vertical landing 203*b*.

FIGS. 2A and 2B illustrate an example wherein the aircraft comprises a fuselage 210; a wing 212 connected to the fuselage 210; and a canard 214 connected to the fuselage 210. Centrifugal fans 104 are installed on the wing 212 and on the canard 214. In one or more such examples wherein the centrifugal fan 104 is external to the fuselage 210 and exposed to airflow, the centrifugal fan 104 is streamlined or includes a fairing to reduce drag.

Figure 3A:
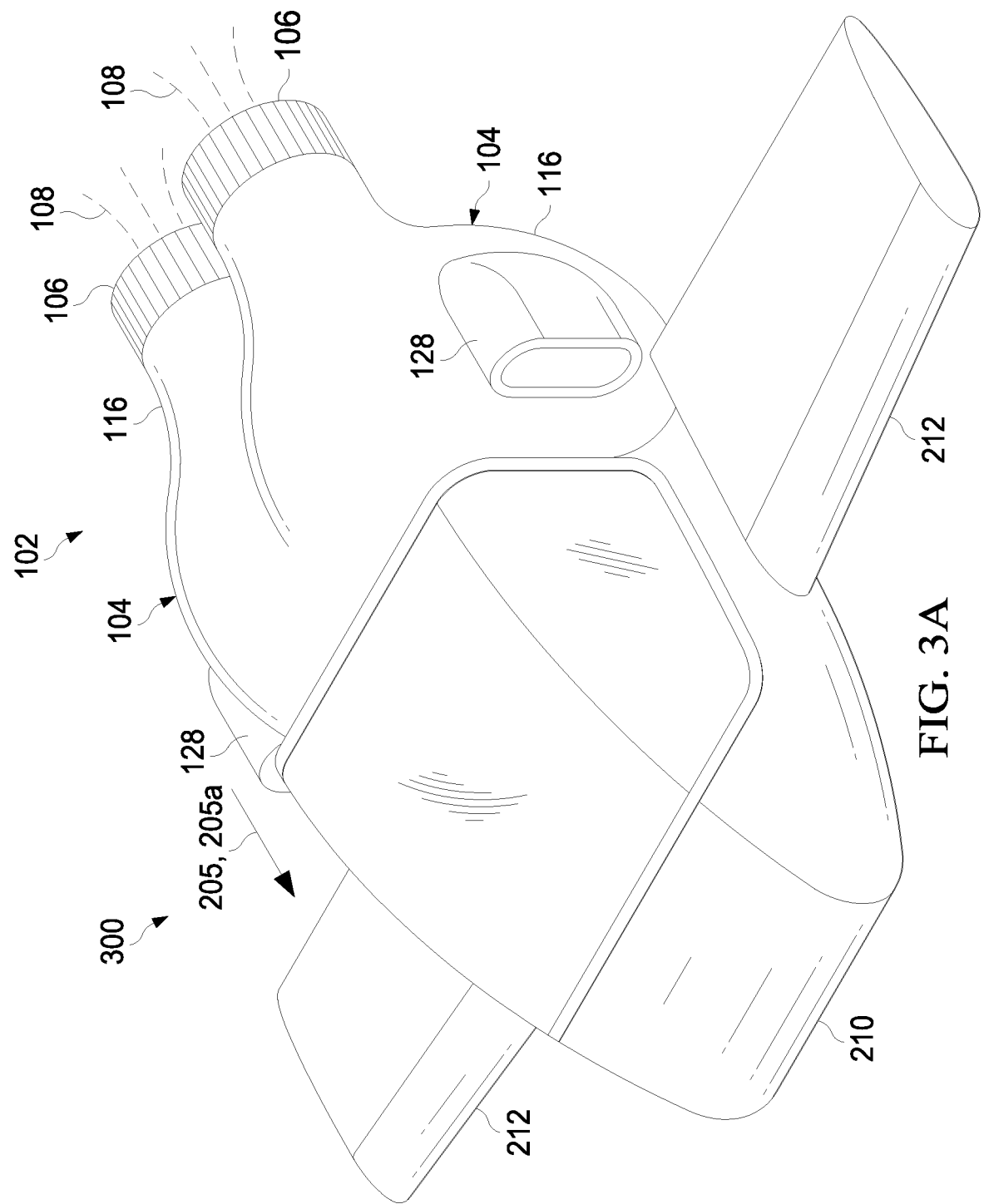
Figure 3B:
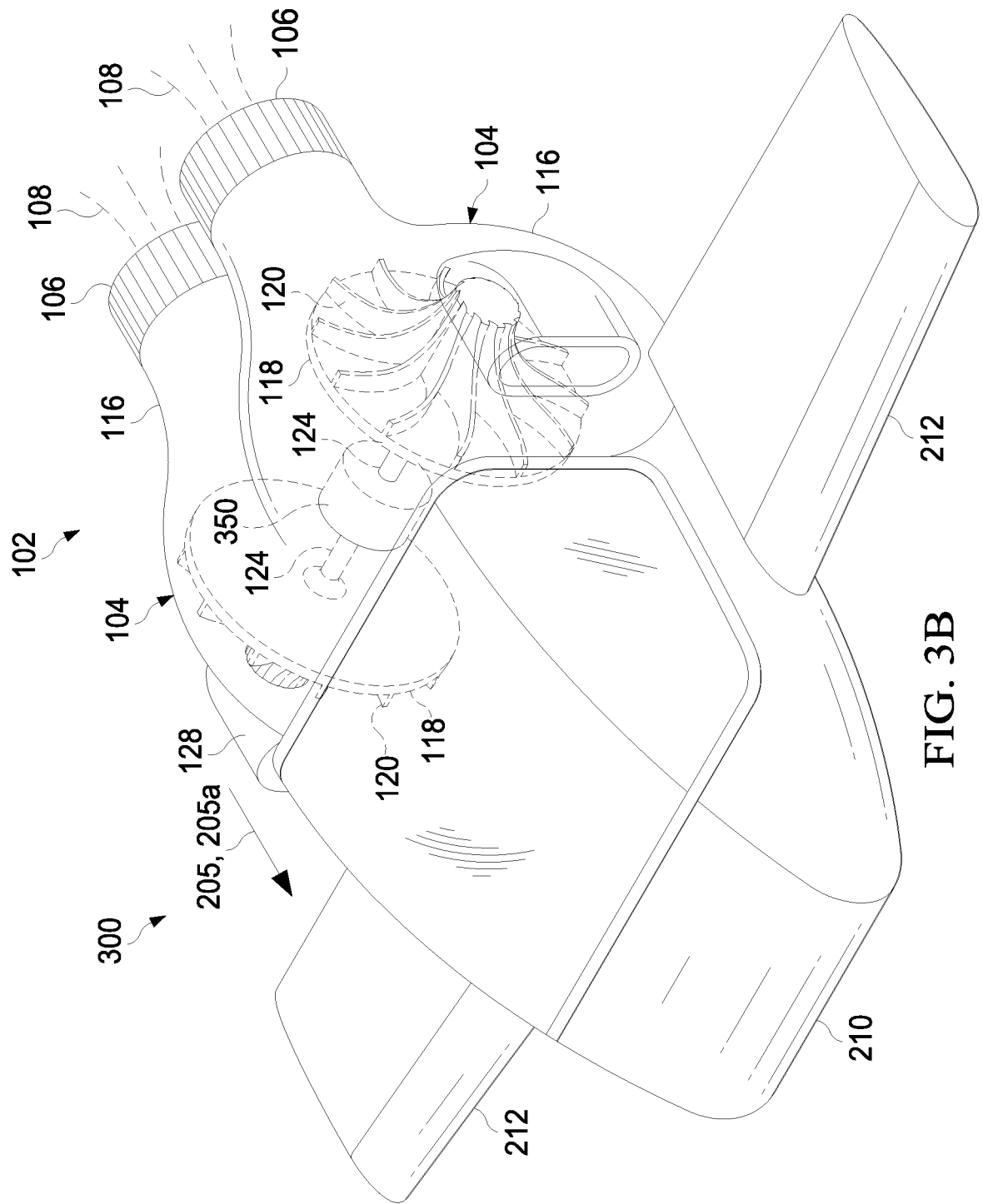
Figure 3C:
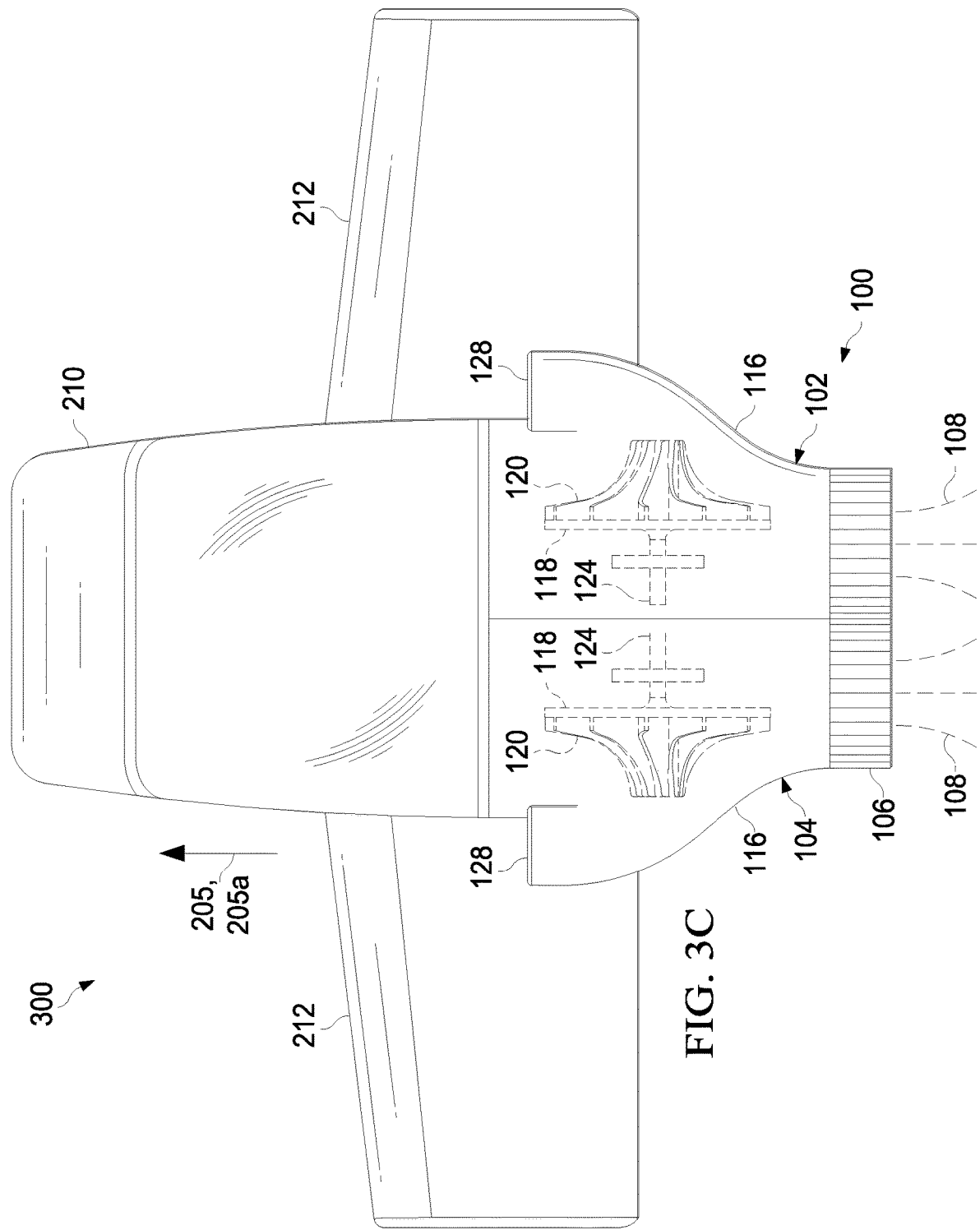

FIGS. 3A-3C illustrate examples of an aircraft 200 wherein one or more centrifugal fans 104 are installed internally within the fuselage 210. In one or more examples, the one or more centrifugal fans 104 are positioned to gyroscopically stabilize the aircraft 200 when the centrifugal fans are operating. The housing 116 for the fan 118 comprises a panel or skin on the aircraft. FIGS. 4A and 4B illustrate operation of the thrust vectoring system 102 illustrated in FIGS. 3A-3C, wherein the nozzle 106 is movably (e.g., slidably or rotatably) connected to the fuselage 210 so as to orient the nozzle 106 relative to the fuselage 210 and vector the thrust 114 generated by the exhaust 108 in a desired direction 115. FIG. 4A illustrates the nozzle 106 oriented in a rearward direction 204 for the forward cruising 205*a* of the aircraft 300. FIG. 4B illustrates the nozzle 106 oriented for the vertical take-off 203*a* or vertical landing 203*b* of the aircraft 300. FIG. 3B further illustrates a motor 350 operably coupled to the fan 118 (e.g., through a transmission including the drive shaft 124) so as to drive the fan 118.

Figure 5A:
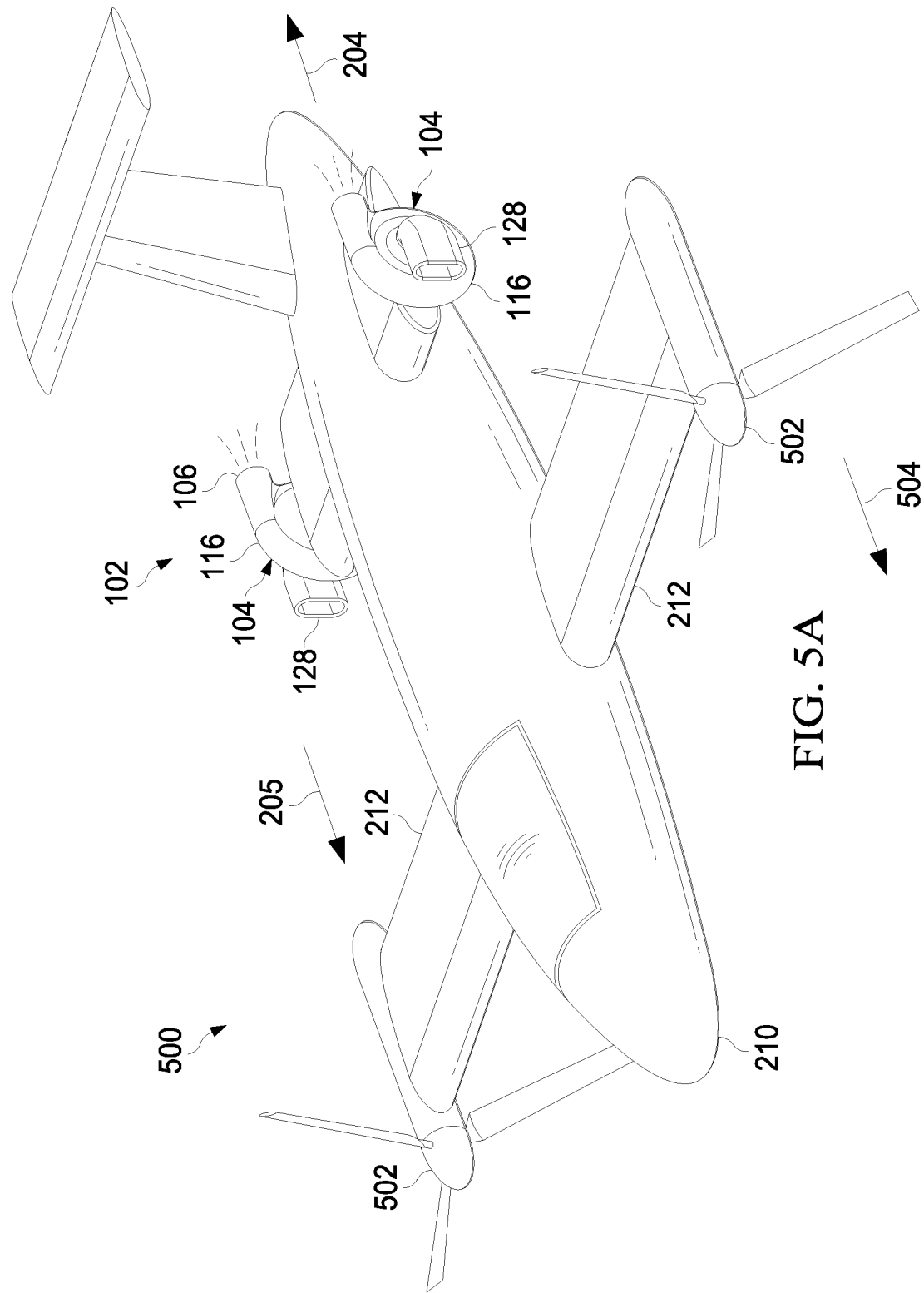
FIG. 5A illustrates an aircraft including a propeller generating propeller thrust, wherein the propeller thrust is supplemented by thrust from two centrifugal fans.

FIG. 5A illustrates an example aircraft 500 including a propulsor 502 and a thrust vectoring system 102 operably coupled to the aircraft 500, wherein the propulsor 502 (e.g., a propeller) is different from a centrifugal fan 104 and is configured to provide an additional thrust 504 for the aircraft in combination with the thrust 114 generated using the centrifugal fan 104.

Figure 5B:
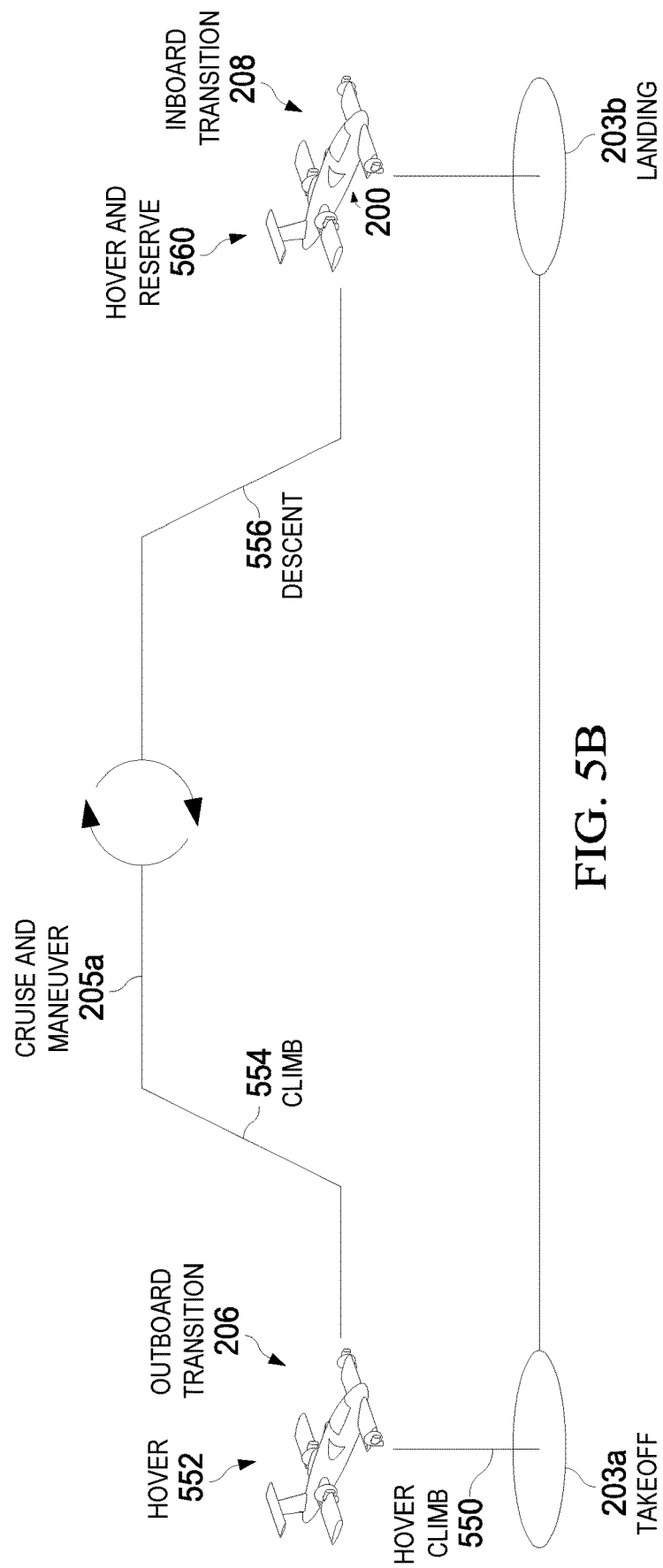
FIG. 5B illustrates example segments of a flight controlled using a thrust vectoring system according to one or more examples described herein.

FIG. 5B illustrates the segments of an example flight comprising: vertical takeoff 203*a*, hovering 552 (e.g., loitering, hover climb 550); transitioning 206 between vertical flight and cruise; cruising 205*a*; in flight climbing 554; descent 556, hovering 560 for landing; transitioning 208 between hovering 560 and vertical landing 203*b*; and vertical landing 203*b*. In one or more examples, the thrust vectoring system 102 directs the thrust 114 for all the segments of the flight. However, as illustrated in FIG. 5A, in some examples the aircraft 500 includes an additional propulsor 502 (e.g., propeller) providing additional thrust 504 and the thrust vectoring system 102 assists/adds thrust 114 to the additional propulsor 504 during the forward cruise 205*a*. In yet further examples, the thrust vectoring system 102 mainly contributes during transitioning 206, vertical takeoff 203*a*, and vertical landing 203*b* segments but does not contribute (or is idle) during forward cruise 205*a* powered by the additional thrust 504. Thus, a power level and/or vectoring of the exhaust 108 is controlled in accordance with the segments of flight and/or depending on the presence of additional propulsors 502 or the lift being provided by lift generating surfaces (e.g., wings 212 or canards 214).

FIGS. 2A, 2B, 3A-3C, 4A-4B, and 5 illustrate a plurality of thrust vectoring systems 102, centrifugal fans 104, and nozzles 106 positioned at different locations on the aircraft. In one or more examples, each of the thrust vectoring systems 102, centrifugal fans 104, and nozzles 106 are configured to be independently oriented so as to independently vector 112 their thrust 114 in a desired direction 115.

Process Steps

Method of Making

Figure 6:
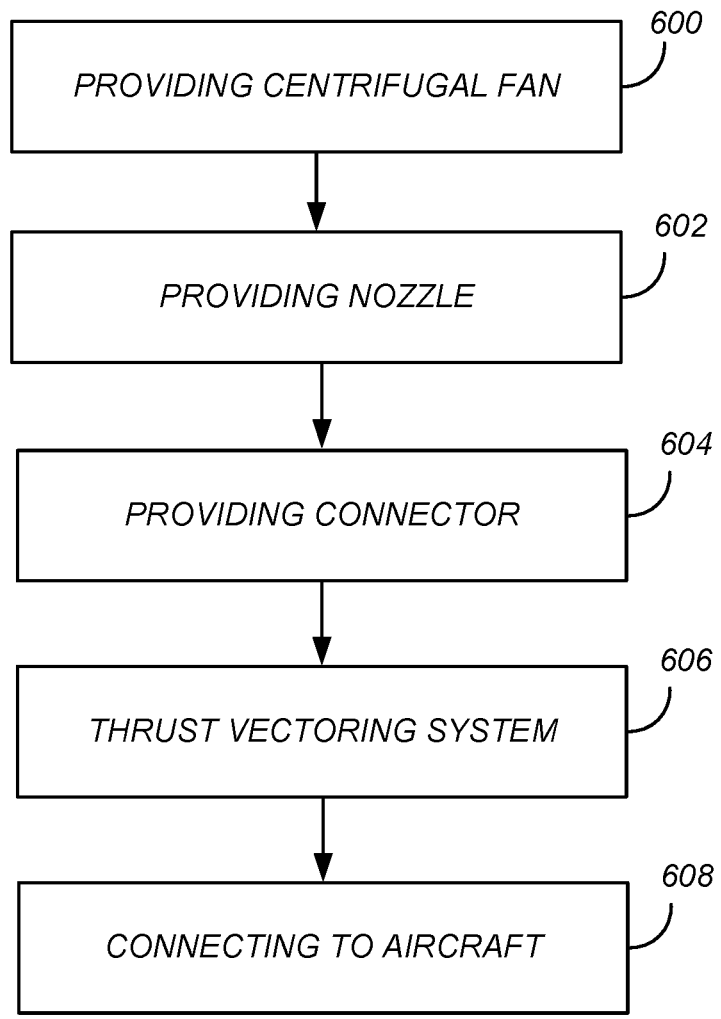
FIG. 6 is a flowchart illustrating a method of making a thrust vectoring system according to one or more examples.

FIG. 6 is a flowchart illustrating a method of making a thrust vectoring system, referring also to FIGS. 1A-1I, 2A-2B, 3A-3C, 4A-4B, and 5.

Block 600 represents providing or fabricating a centrifugal fan 104. In one or more examples, the centrifugal fan 104 further includes a housing 116 (e.g., a casing) and a fan 118 disposed in the housing 116. The fan 118 includes a plurality of fan blades 120 attached to a hub 122. In one or more further examples, the housing 116 includes an inlet 128. Example positions for the inlet 128 include, but are not limited to, on a side of the housing facing away from the structure (e.g., fuselage 210) being attached to the housing 116 or on a side of the housing 116 facing the structure being attached to the housing (e.g., between the housing and the structure).

Block 602 represents providing an outlet (e.g., a nozzle 106) to the centrifugal fan 104, wherein the outlet is configured to guide and output an exhaust 108 from the centrifugal fan 104. In one or more examples, the outlet is integrally formed with the housing 116.

Block 604 represents optionally providing a mechanism 125 comprising a connector or coupling for connecting, coupling, or mounting the centrifugal fan 104 to a vehicle, or the outlet (e.g., nozzle 106) to the housing 116. In one or more examples, the connector (e.g., comprising bearings or the like) is configured to connect the housing 116 to a structure (e.g., fuselage or wing) on a vehicle so as to allow the housing 116 to rotate relative to the vehicle for producing thrust in a desired direction 115. In another example, the connector (e.g., a sliding mechanism) is configured to slidably connect the nozzle 106 to the housing 116, thereby allowing movement of the nozzle 106 that orients 110 the thrust 114 in a desired direction 115.

Block 606 represents the end result, a thrust vectoring system 102. Illustrative, non-exclusive examples of inventive subject matter according to the present disclosure are described in the following enumerated paragraphs:

A1. An apparatus 100, comprising: a thrust vectoring system 102 including a centrifugal fan 104 and a nozzle 106 configured to output an exhaust 108 from the centrifugal fan 104, wherein the thrust vectoring system 102 is configured to controllably orient 110 at least one of the centrifugal fan or the nozzle 106 to vector 112 or direct a thrust 114 generated by the exhaust 108.

A2. The apparatus of paragraph A1, wherein the thrust vectoring system 102 is configured to orient 110 the at least one of the centrifugal fan 104 or the nozzle 106 to vector 112 or direct the thrust 114 in substantially any desired direction 115.

A3. The apparatus of paragraph A1 or A2, wherein the thrust vectoring system 102 rotates only a direction of the exhaust 108 (relative to a vehicle connected to the thrust vectoring system), rather than re-orienting an entire propulsion system generating the exhaust as is required with a conventional tilt-wing or tilt-rotor systems.

A4. The apparatus of any of the paragraphs A2-A3, wherein the desired direction 115 includes at least one of: a vertical direction 202 for a vertical take-off 203a or a vertical landing 203b of an aircraft 200 coupled to the thrust vectoring system 102 (exhaust 108 oriented in a downward direction 203c), a forward direction 205 for a forward cruising of the aircraft 200 (exhaust 108 oriented in a rearward direction 204), a first transition direction 206 for transitioning between the vertical take-off 203a and the forward cruising 205, or a second transition direction 208 for transitioning between the forward cruising and the vertical landing 203b.

A5. The apparatus of any of the paragraphs A1-A4, wherein the centrifugal fan 104 further includes a housing 116, a fan 118 disposed in the housing 116, the fan 118 includes a plurality of fan blades 120 attached to a hub 122, the apparatus further comprises a drive shaft 124 having a rotation axis 126 and the drive shaft 124 is operatively coupled to the hub 122 to rotate 110a the fan blades 120 about the rotation axis 126.

A6. The apparatus of any of the paragraphs A1-A2 or A4-A5, further comprising a mechanism 125 configured to rotatably connect the housing 116 to a vehicle, such that the housing 116 rotates 110a about the rotational axis 126 to vector the thrust 114 generated by the exhaust 108.

A7. The apparatus of any of the paragraphs A1-A6, further comprising a connector movably connecting the nozzle 106 to the centrifugal fan 104, such that the nozzle 106 can be rotated about the rotational axis 126 to vector the thrust 114 generated by the exhaust 108.

A8. The apparatus of any of the paragraphs A1-A7, wherein the thrust vectoring system 102 includes an inlet 128 configured to direct a flow 130 of air 132 into the centrifugal fan 104 along a first direction 134, and the centrifugal fan 104 is configured to redirect 135 and form the flow 130 of the air 132 into the exhaust 108 along a second direction 136, wherein the second direction 136 is at angle to the first direction 134, the second direction 136 is different from the first direction 134, or the first direction 134 is parallel to the second direction 136.

A9. The apparatus of paragraph A8, wherein the inlet 128 comprises an intake scoop for directing airflow into the housing 116 and toward the fan 118.

A10. The apparatus of paragraph A1, wherein the centrifugal fan 104 is configured so that at least a portion of the exhaust 108 is generated from a flow 130 of air 132 entering or inputted into the fan 118 along a first direction 134 (e.g., a tangential direction) and expelled from the centrifugal fan 104 in the first direction 134.

A11. The apparatus of paragraph A1 or A10, wherein the centrifugal fan comprises a Pelton turbine or a blower.

A12. The thrust vectoring system, wherein a shape of the housing 116 and/or nozzle 106 are configured to increase or tailor pressure and/or velocity of the exhaust 108 and wherein dimensions of the centrifugal fan 104 and the nozzle 106 are such that the pressure at the mouth opening 152 of the nozzle is not decreased by more than 10% as compared to the pressure of the output flow 117 entering the nozzle from the centrifugal fan 104.

Block 608 represents operably coupling the thrust vectoring system 102 to a vehicle. Examples of the vehicle include, but are not limited to, an aircraft 200, a train, a car, a bus, a truck, or a watercraft (e.g., a boat or submarine). Illustrative, non-exclusive examples of are further described in the following enumerated paragraphs:

A13. A vehicle comprising the thrust vectoring system 102 of any of the paragraphs A1-A11, wherein the thrust vectoring system 102 vectors 112 or directs the thrust 114 propelling the vehicle.

A14. The vehicle of paragraph A13 wherein at least one of the centrifugal fan 104 or the nozzle 106 are configured to rotate relative to the vehicle to produce/redirect the thrust 114 in the desired direction 115 or in any direction between a vertical direction (vertically upwards or vertically downwards) and a horizontal direction (forwards or backwards), any radial direction defined by a unit vector r and angle θ in polar coordinates having an origin on the rotational axis 126, wherein 0≤θ≤360 degrees, in the plane perpendicular to the rotational axis or in any plane tilted relative to the plane perpendicular to the rotational axis 126 (e.g. by tilting the nozzle 106).

A15. The vehicle of any of the paragraphs A13-A14, wherein the vehicle comprises an aircraft 300 comprising a fuselage 210 and the centrifugal fan 104 or the fan 118 is within the fuselage 210.

A16. The aircraft 300 of paragraph A15, wherein the centrifugal fan 104 is positioned to gyroscopically stabilize the aircraft 300 when the centrifugal fan 104 is operating.

A17. The vehicle of any of the paragraphs A13-A16 wherein the vehicle comprises an aircraft 200 further comprising a wing 212 and the centrifugal fan 104 is positioned on the wing.

A18. The aircraft 200 of paragraph A17, wherein the centrifugal fan 104 is sufficiently compact and/or streamlined to be mounted to the wing 212 so as to not encumber, or substantially reduce lift generated by, the wing 212.

A19. The vehicle of any of the paragraphs A13-A18, wherein the vehicle comprises an aircraft 200 further comprising a canard 214 and the centrifugal fan 104 is positioned on the canard 214.

A20. The aircraft 200 of paragraph A19, wherein the centrifugal fan 104 is sufficiently compact and/or streamlined so as not to encumber, substantially disturb intended airflow over, or impair control provided by, the canard 214 (e.g., the centrifugal fan does not disturb or impair control by more than 10%).

A21. The vehicle of any of the embodiments A13-A20 wherein the centrifugal fan 104 and/or nozzle 106 includes a fairing, an aerodynamic shape, or other configuration that prevents or avoids detrimental interaction of the centrifugal fan 104 or the nozzle 106 with airflow over an aerodynamic surface or structure (e.g., airframe, the fuselage, or wing) of the vehicle. Detrimental interaction includes, but is not limited to, an interaction that reduces lift, speed, control, or aerodynamic cross-section of the vehicle by more than 10%, or an interaction that causes undesirable impingement of airflow on the aerodynamic surfaces of the vehicle.

A22. The vehicle of any of the paragraphs A13-A21 wherein the thrust vectoring system 102 does not include a deflection system or turning system that deflects or turns the exhaust 108 in a way that incurs loss in the thrust (e.g. by more than 10%) due to separation of flow in the exhaust 108.

A23. The vehicle or thrust vectoring system 102 of any of the paragraphs A1-A22, wherein the combination of the centrifugal fan 104 and the nozzle 106 has a length or other relevant dimension smaller or shorter than is necessary to prevent flow separation of the exhaust 108 and its consequent significant pressure losses.

A24. The vehicle of any of the embodiments A13-A23, wherein the vehicle does not include a dedicated lift system in which a fixed vertical propulsor is used to provide only vertical thrust, thereby avoiding weight of the fixed vertical propulsor that is only used during the take-off 203*a* and the landing 203*b*.

A25. The vehicle of any of the paragraphs A13-A24, further comprising:

a propulsor 502 (e.g., propeller, gas turbine engine) different from the centrifugal fan 104, wherein the propulsor 502 is configured to provide an additional thrust 504 for the vehicle in combination with the thrust 114.

A26. The vehicle of any of the paragraphs A13-A25, wherein the vehicle comprises an aircraft 200, 300 and at least one of, the centrifugal fan 104 or the nozzle 106, are movably connected to the aircraft 200, 300 such that the thrust vectoring system 102 orients the at least one of, the centrifugal fan 104 or the nozzle 106, relative to the aircraft 200, 300 to generate and vector 112 or direct the thrust 114 generated by the exhaust 108.

A27. The vehicle of any of the paragraphs A1-A26, further comprising a plurality of the centrifugal fans 104 attached to different locations on the vehicle, the different locations including at least one of a wing 212, a canard 214, or a fuselage 210, inside a fuselage, and different positions on the wing 212 or the canard 214.

A28. The vehicle of any of the paragraphs A1-A27, wherein the vehicle comprises an aircraft 200, 300.

Method of Operation

Figure 7:
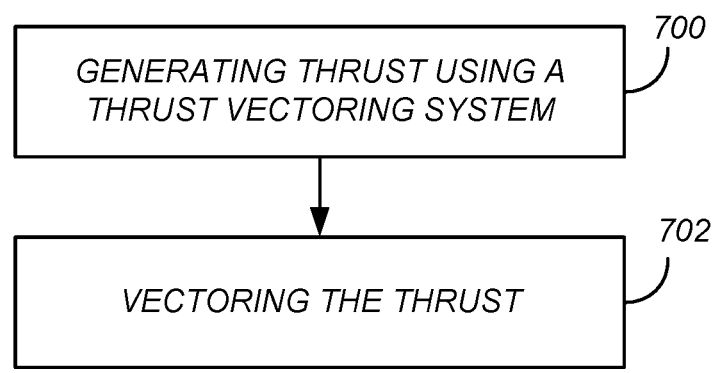
FIG. 7 is a flowchart illustrating a method of vectoring thrust, according to one or more examples.

FIG. 7 is a flowchart illustrating a method of vectoring thrust.

Block 700 represents generating a thrust, via a thrust vectoring system, by outputting an exhaust from a centrifugal fan, wherein the thrust vectoring system includes the centrifugal fan and a nozzle.

Block 702 represents vectoring or directing the thrust by controllably orienting at least one of the centrifugal fan or the nozzle.

The method is embodied in many ways including, but not limited to, the methods in the following paragraphs.

B1. The method wherein the orienting 110 vectors, adjusts, or directs the thrust for at least one of: a vertical take-off of an aircraft 200, 300 coupled to the thrust vectoring system, a forward cruising of the aircraft, a first transition between the vertical take-off and the forward cruising, a vertical landing of the aircraft, or a second transition between the forward cruising and the vertical landing.

B2. The method using the thrust vectoring system 102, centrifugal fan 104, and nozzle 106 according to examples described herein including any of the paragraphs A1-A28.

CONCLUSION

This concludes the description of the examples of the present disclosure. The foregoing description of the examples has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus, comprising:
a thrust vectoring system including a centrifugal fan and a nozzle configured to output an exhaust from the centrifugal fan, wherein the centrifugal fan includes a plurality of fan blades attached to a hub having a rotation axis:
the thrust vectoring system is configured to controllably orient at least one of, the centrifugal fan or the nozzle about the rotation axis, to vector a thrust generated by the exhaust.

2. The apparatus of claim 1, wherein the thrust vectoring system is configured to orient the at least one of, the centrifugal fan or the nozzle, to vector the thrust in a desired direction.

3. The apparatus of claim 2, wherein the desired direction includes at least one of: a vertical direction for a vertical take-off or a vertical landing of an aircraft operatively coupled to the thrust vectoring system, a forward direction for a forward cruising of the aircraft, a first transition direction for transitioning between the vertical take-off and the forward cruising, or a second transition direction for transitioning between the forward cruising and the vertical landing.

4. The apparatus of claim 3, wherein:
the centrifugal fan further includes a housing and the fan disposed in the housing, and
the apparatus further comprises a drive shaft having the rotation axis, the drive shaft operatively coupled to the hub to rotate the fan blades about the rotation axis.

5. The apparatus of claim 4, further comprising a mechanism configured to rotatably connect the housing to the aircraft, such that the housing rotates about the rotational axis to vector the thrust.

6. The apparatus of claim 4, wherein the nozzle is movably connected to the centrifugal fan, such that the nozzle can be rotated about the rotational axis-to vector the thrust.

7. The apparatus of claim 1, wherein:
the thrust vectoring system includes an inlet configured to direct a flow of air into the centrifugal fan along a first direction, and
the centrifugal fan is configured to redirect and form the flow of the air into the exhaust along a second direction.

8. An aircraft comprising the thrust vectoring system of claim 1, wherein the thrust vectoring system vectors the thrust propelling the aircraft.

9. The aircraft of claim 8, wherein the aircraft comprises a fuselage and the centrifugal fan is within the fuselage.

10. The aircraft of claim 9, wherein the centrifugal fan is positioned to gyroscopically stabilize the aircraft when the centrifugal fan is operating.

11. The aircraft of claim 8, further comprising:
a wing, wherein the centrifugal fan is positioned on the wing.

12. The aircraft of claim 8, further comprising:
a canard, wherein the centrifugal fan is positioned on the canard.

13. The aircraft of claim 8, further comprising:
a propulsor different from the centrifugal fan, wherein the propulsor is configured to provide an additional thrust for the aircraft in combination with the thrust generated by the exhaust.

14. The aircraft of claim 8, wherein the at least one of, the centrifugal fan or the nozzle, are movably connected to the aircraft such that the thrust vectoring system orients the at least one of, the centrifugal fan or the nozzle, relative to the aircraft to generate and vector the thrust.

15. A method of vectoring thrust, comprising:
generating a thrust, via a thrust vectoring system, by outputting an exhaust from a centrifugal fan, wherein the thrust vectoring system includes the centrifugal fan and a nozzle wherein the centrifugal fan includes a plurality of fan blades attached to a hub having a rotation axis; and
vectoring the thrust by controllably orienting at least one of the centrifugal fan or the nozzle about the rotation axis.

16. The method of claim 15, wherein the orienting vectors the thrust for at least one of: a vertical take-off of an aircraft coupled to the thrust vectoring system, a forward cruising of the aircraft, a first transition between the vertical take-off and the forward cruising, a vertical landing of the aircraft, or a second transition between the forward cruising and the vertical landing.

17. The method of claim 15, wherein:
the thrust vectoring system includes an inlet configured to direct a flow of air into the centrifugal fan,
the centrifugal fan includes a housing and a fan disposed in the housing,
the thrust vectoring system further comprises a drive shaft having the rotation axis, the drive shaft operatively coupled to the hub to rotate the fan blades about the rotation axis, and
the method further comprising redirecting the flow of the air using the centrifugal fan to form the flow of air into the exhaust and the orienting comprising turning the housing or the nozzle about the rotation axis to vector the thrust.

18. The method of claim 15, further comprising:
operably coupling the thrust vectoring system to an aircraft including a fuselage; and
positioning the centrifugal fan within the fuselage.

19. The method of claim 15, further comprising:
operably coupling the thrust vectoring system to an aircraft including a wing; and
positioning the centrifugal fan on the wing.

20. The method of claim 15, further comprising:
operably coupling the thrust vectoring system to an aircraft including a canard; and
positioning the centrifugal fan on the canard.

21. The apparatus of claim 4, wherein the nozzle is movably connected to the centrifugal fan, such that the nozzle is rotated about the rotational axis to vector the thrust, and both the fan blades and the nozzle rotate in a same plane perpendicular to the rotational axis.

* * * * *

UNITED STATES PATENT AND TRADEMARK OFFICE
CERTIFICATE OF CORRECTION

PATENT NO. : 11,332,241 B2
APPLICATION NO. : 16/843203
DATED : May 17, 2022
INVENTOR(S) : Luis Linero Gonzalez It is certified that error appears in the above-identified patent and that said Letters Patent is hereby corrected as shown below:

In the Claims

Column 10
Line 30, delete the text, "rotation axis:"
And insert the text, --rotation axis; and--

Signed and Sealed this
Twenty-fifth Day of October, 2022

Katherine Kelly Vidal
*Director of the United States Patent and Trademark Office*